United States Patent
Shirai

(10) Patent No.: US 8,922,383 B2
(45) Date of Patent: Dec. 30, 2014

(54) ELECTRONIC EQUIPMENT AND IMAGE FORMING APPARATUS

(75) Inventor: Takaaki Shirai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 771 days.

(21) Appl. No.: 13/161,922

(22) Filed: Jun. 16, 2011

(65) Prior Publication Data

US 2011/0317457 A1 Dec. 29, 2011

(30) Foreign Application Priority Data

Jun. 28, 2010 (JP) ................................ 2010-146446

(51) Int. Cl.
*G08B 21/00* (2006.01)
*H04B 3/54* (2006.01)
*H04B 3/46* (2006.01)

(52) U.S. Cl.
CPC ... *H04B 3/54* (2013.01); *H04B 3/46* (2013.01)
USPC ...... 340/635; 340/693.1; 358/1.14; 358/1.15; 358/474; 361/728; 361/679.02

(58) Field of Classification Search
CPC ............. H01L 2924/3011; H01L 2924/15167; H01L 2224/48091; G06F 1/18; G11B 33/126
USPC .............. 358/1.14, 1.15, 1.13, 468, 474, 471, 358/401, 501, 296; 713/300, 310, 320; 361/728, 679.02, 600, 601, 792, 735; 340/635, 693.1, 7.32
See application file for complete search history.

(56) References Cited

U.S. PATENT DOCUMENTS

| | | | | |
|---|---|---|---|---|
| 6,735,968 | B2 * | 5/2004 | Kurita et al. | 62/228.4 |
| 7,376,760 | B1 * | 5/2008 | Ivchenko et al. | 710/8 |
| 7,825,799 | B2 | 11/2010 | Takahashi et al. | |
| 7,978,489 | B1 * | 7/2011 | Telefus et al. | 363/146 |
| 8,248,771 | B2 * | 8/2012 | Chang | 361/679.02 |
| 8,373,871 | B2 * | 2/2013 | Taki et al. | 358/1.14 |

(Continued)

FOREIGN PATENT DOCUMENTS

| | | |
|---|---|---|
| JP | 7-307690 | 11/1995 |
| JP | 8-264792 | 10/1996 |

(Continued)

OTHER PUBLICATIONS

Office Action issued Sep. 24, 2013, in Japanese Patent Application No. 2010-146446.

(Continued)

*Primary Examiner* — Hoi Lau
(74) *Attorney, Agent, or Firm* — Oblon, Spivak, McClelland, Maier & Neustadt, L.L.P.

(57) ABSTRACT

Electronic equipment includes: a first substrate; a second substrate; and a harness that connects the first substrate and the second substrate with other. The first substrate includes: a conversion unit that outputs converted power converted from supply of power supplied by a power source, and a control unit that outputs a control signal used to control output of the supply of power to the second substrate. The second substrate includes: a semiconductor circuit operated by the supply of power and the converted power, and a connector that outputs the control signal to the power source. The harness includes a signal line of the control signal and a power line through which the converted power is supplied from the first substrate to the second substrate.

7 Claims, 4 Drawing Sheets

(56) References Cited

U.S. PATENT DOCUMENTS

| | | | |
|---|---|---|---|
| 2003/0182956 A1* | 10/2003 | Kurita et al. | 62/228.1 |
| 2004/0022184 A1 | 2/2004 | Van Lieu et al. | |
| 2004/0194486 A1* | 10/2004 | Kurita et al. | 62/228.4 |
| 2006/0152085 A1* | 7/2006 | Flett et al. | 307/75 |
| 2007/0183130 A1* | 8/2007 | Yamabuchi et al. | 361/728 |
| 2008/0239184 A1* | 10/2008 | Kim et al. | 349/41 |
| 2009/0034021 A1* | 2/2009 | Taki et al. | 358/474 |
| 2009/0115395 A1* | 5/2009 | Pan | 323/371 |
| 2010/0177472 A1* | 7/2010 | Chang | 361/679.02 |
| 2011/0043050 A1* | 2/2011 | Yabe et al. | 307/104 |
| 2011/0279548 A1* | 11/2011 | Yamamoto et al. | 347/54 |
| 2011/0317457 A1* | 12/2011 | Shirai | 363/74 |
| 2012/0090881 A1* | 4/2012 | Sugiura et al. | 174/257 |
| 2014/0210260 A1* | 7/2014 | Hirose | 307/10.1 |

FOREIGN PATENT DOCUMENTS

| | | |
|---|---|---|
| JP | 10-129079 | 5/1998 |
| JP | 2001-275385 | 10/2001 |
| JP | 2004-31009 | 1/2004 |
| JP | 2007-167253 | 7/2007 |
| JP | 2007-222250 | 9/2007 |
| JP | 2008-32760 A | 2/2008 |
| JP | 2008-90354 A | 4/2008 |
| JP | 2008-143469 | 6/2008 |
| JP | 2010-212133 | 9/2010 |
| JP | 2011-192174 A | 9/2011 |

OTHER PUBLICATIONS

Extended European Search Report Issued Oct. 26, 2011, in European Patent Application No. 11170475.5.

* cited by examiner

ELECTRONIC EQUIPMENT AND IMAGE FORMING APPARATUS

CROSS-REFERENCE TO RELATED APPLICATIONS

The present application claims priority to and incorporates by reference the entire contents of Japanese Patent Application No. 2010-146446 filed in Japan on Jun. 28, 2010.

BACKGROUND OF THE INVENTION

1. Field of the Invention

The present invention relates to electronic equipment and an image forming apparatus.

2. Description of the Related Art

There is known a semiconductor circuit requiring a plurality of power sources and being set a condition in supplying power (such as prohibition of the input to an IO power without input to a core power). In an electronic substrate with such a semiconductor circuit mounted thereon, there is a concern that the semiconductor circuit may break down if the IO power is input while the core power is not supplied. Thus, it is necessary that a power supply condition be met. For example, Japanese Patent Application Laid-open No. H8-264792 discloses a technique to satisfy the power supply condition by providing a switch unit inside a semiconductor circuit.

Regarding the configuration with the switch as in Japanese Patent Application Laid-open No. H8-264792, which controls the power supply condition, the semiconductor circuit is likely to break down if a power harness is disconnected. Furthermore, inclusion of the switch, as in Japanese Patent Application Laid-open No. H8-264792, may complicate the configuration to lead to an increase in cost.

SUMMARY OF THE INVENTION

It is an object of the present invention to at least partially solve the problems in the conventional technology.

According to an aspect of the present invention, there is provide an electronic equipment that includes a first substrate; a second substrate; and a harness that connects the first substrate and the second substrate with each other. The first substrate includes: a conversion unit that outputs converted power converted from supply of power supplied by a power source, and a control unit that outputs a control signal used to control output of the supply of power to the second substrate. The second substrate includes: a semiconductor circuit operated by the supply of power and the converted power, and a connector that outputs the control signal to the power source. The harness includes a signal line of the control signal and a power line through which the converted power is supplied from the first substrate to the second substrate.

According to another aspect of the present invention, there is provided an image forming apparatus that includes a first substrate; a second substrate; and a harness connecting the first and second substrates to each other. The first substrate includes: a conversion unit that outputs converted power converted from supply of power supplied from a power source, and a control unit outputting a control signal used to control output of the supply of power to the second substrate. The second substrate includes a semiconductor circuit operated by the supply of power and the converted power, and a connector that outputs the control signal to the power source. The harness includes a signal line of the control signal and a power line through which the converted power is supplied from the first substrate to the second substrate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Electronic equipment and an image forming apparatus will be described with reference to the accompanying drawings according to an embodiment of the invention.

Figure 1:
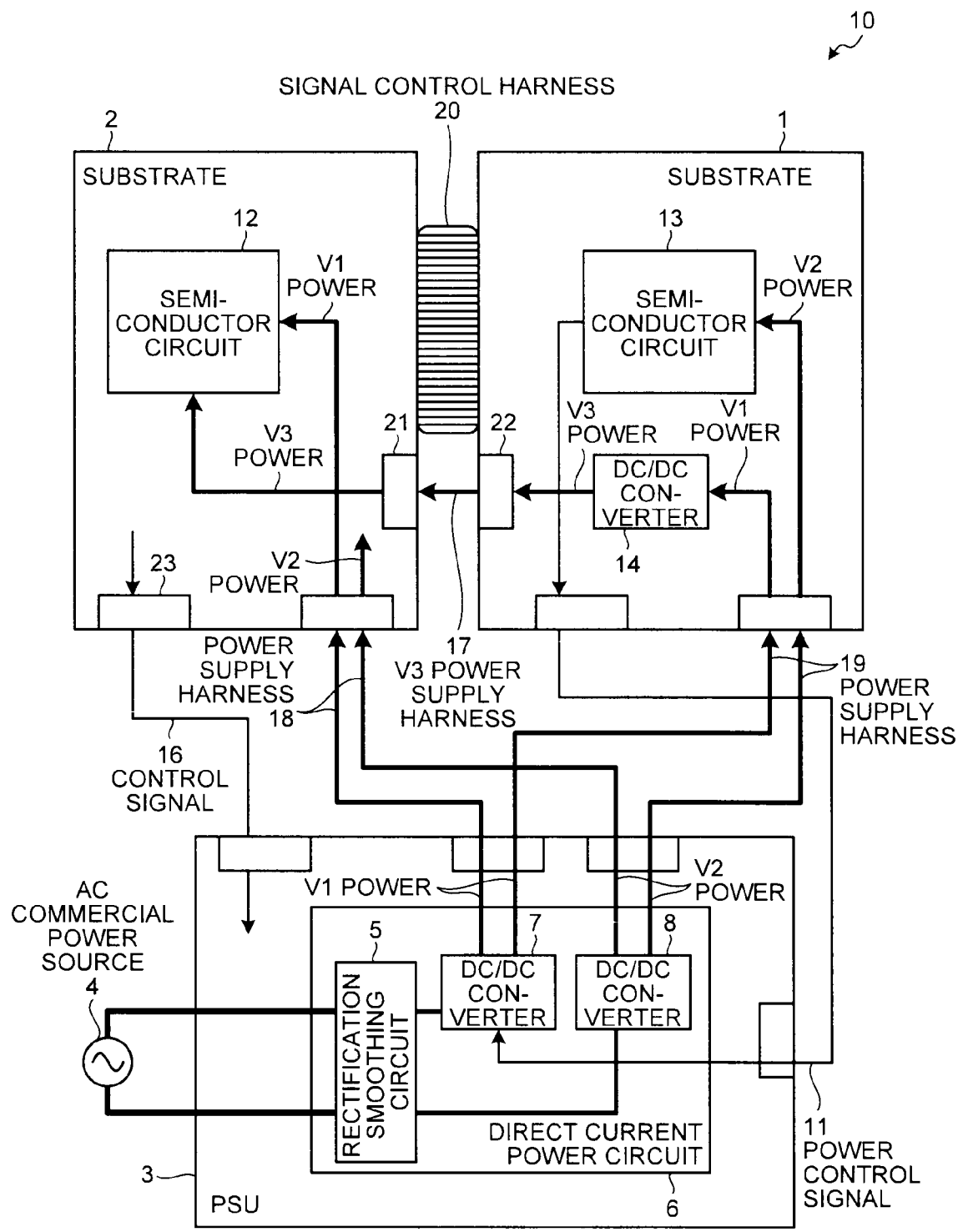
FIG. 1 is a block diagram illustrating an example of the configuration of electronic equipment equipped with semiconductor circuits that may break down.

FIG. 1 is a block diagram illustrating an example of the configuration of electronic equipment 10 with semiconductor circuits that are likely to break down. The electronic equipment 10 includes a substrate 1, a substrate 2, and a power supply unit (PSU) 3.

A semiconductor circuit 13 serving as a semiconductor circuit is mounted on the substrate 1, which includes a DC/DC converter 14 and a connector 22. A semiconductor circuit 12 serving as another semiconductor circuit is mounted on the substrate 2 which includes connectors 21 and 23. The semiconductor circuits 12 and 13 are mounted on different substrates, and are connected with each other via an inter-substrate signal control harness 20.

The semiconductor circuit 12 needs power supplied by a plurality of power sources including an TO power supply and a core power supply (hereinafter, "power supplied by a power source" is simply referred to as "power"). That is, the semiconductor circuit 12 is supplied a V1 power (the IC power) by the PSU 3 and a V3 power (the core power) by the DC/DC converter 14 that is mounted on the substrate 1. There exists a power supply condition for the semiconductor circuit 12 to prohibit supplying the IO power to the semiconductor circuit 12 under no supply of the core power. When the V1 power is input with no input of the V3 power, there is a possibility that the semiconductor circuit 12 may break down.

Cost reduction can be expected when the DC/DC converter 14 that generates the V3 power is mounted on the substrate 1 only and not on the substrate 2.

In the PSU 3, the V1 power and a V2 power are generated from an AC commercial power source 4 by DC/DC converters 7 and 8, respectively, via a rectification smoothing circuit 5 included in a direct current power circuit 6. The V2 power is a power generated on a steady basis. The V1 power can be on/off-controlled depending on a state of its use. For example, the V1 power supplied by the DC/DC converter 7 is on/off-controlled by a power control signal 11 through which a signal is output from the semiconductor circuit 13 having a function of a control unit that controls the PSU 3 serving as a power source.

The power is supplied from the PSU 3 to the substrates 1 and 2 through power supply harnesses 18 and 19, respectively. A control signal 16 from the substrate 1 to the PSU 3 and the power control signal 11 from the substrate 2 to the PSU 3 are supplied through the harness. The connectors 21 and 22 are connected through a V3 power supply harness 17 supplying the V3 power from the substrate 1 to the substrate 2.

In order to satisfy the power supply condition of the semiconductor circuit 12, it can be configured that the power is once supplied from the PSU 3 to the substrate 1 through the harness and the V1 power and V3 power are supplied through the harness. In this configuration, when the harness is disconnected, the supply of the V1 power and the supply of V3 power are simultaneously interrupted, so that the power supply condition of the semiconductor circuit 12 can be satisfied. However, when the power supply from the PSU 3 to the substrate 1 is concentrated on one harness, the power capacity of the harness increases and the increased thickness of the harness may lead to an increase in cost and brings about a need to meet a safety standard. For this reason, it is preferable to divide the power supply path into two (the substrates 1 and 2), as shown in FIG. 1.

In a case where the V3 power supply harness 17 is disconnected in the configuration of FIG. 1, the V1 power may be supplied from the PSU 3 but the V3 power is not supplied to the semiconductor circuit 12, and, therefore, there arises the possibility that the semiconductor circuit 12 may break down.

Figure 2:
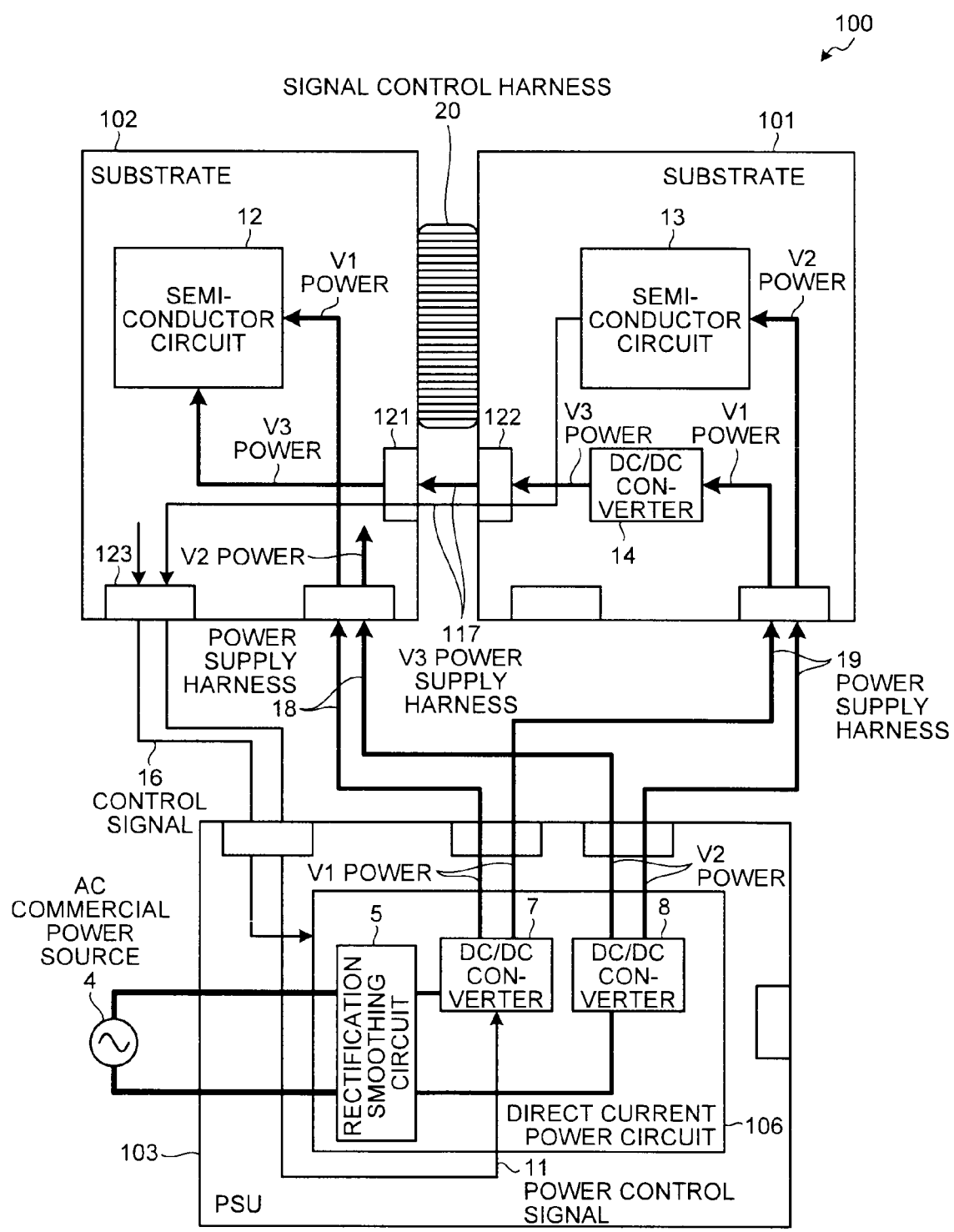
FIG. 2 is a block diagram illustrating an example of the configuration of electronic equipment according to an embodiment.
Figure 3:
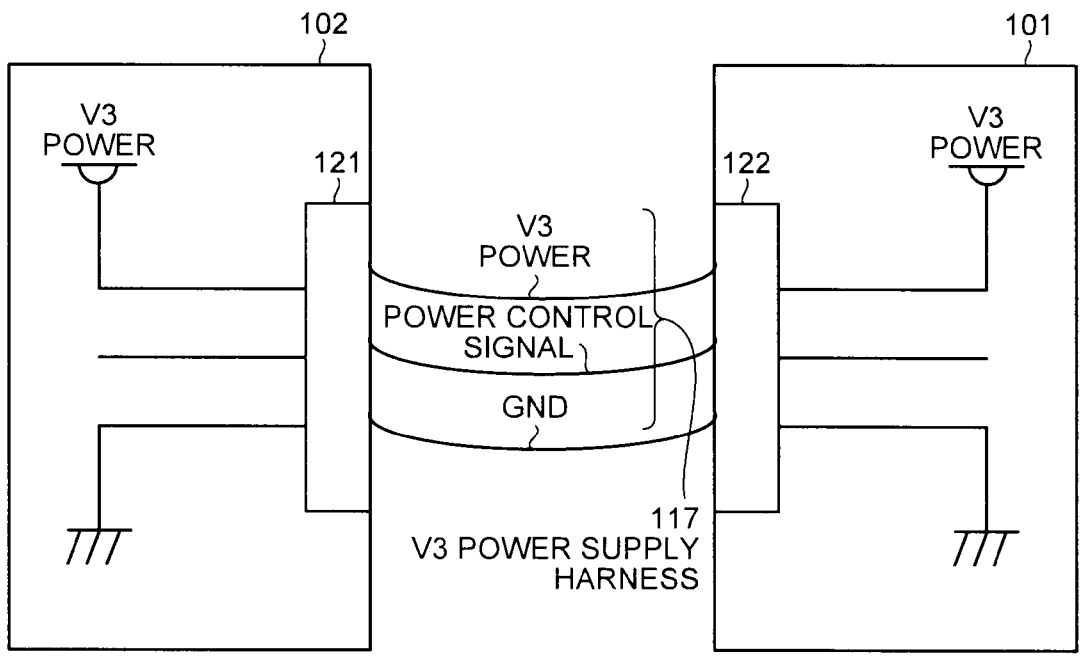
FIG. 3 is a diagram illustrating an example of an a V3 power supply harness used in the electronic equipment according to the embodiment.

In this embodiment, the semiconductor circuit 12 is configured so as not to break down even when the harness that supplies the V3 power is disconnected. FIG. 2 is a block diagram illustrating an example of the configuration of electronic equipment 100 according to this embodiment. FIG. 3 is a diagram illustrating an example of the configuration of a V3 power supply harness 117 used in the electronic equipment 100 according to this embodiment.

As shown in FIG. 2, the electronic equipment 100 according to this embodiment includes a substrate 101, a substrate 102, and a PSU 103.

A semiconductor circuit 13 is mounted on the substrate 101 that includes a DC/DC converter 14 and a connector 122. This electronic equipment is different from the electronic equipment 10 of FIG. 1 in that the substrate 101 is connected with the substrate 102 via a signal line that transmits a power control signal and the connector 122

A semiconductor circuit 12 is mounted on the substrate 102 that includes connectors 121 and 123. The substrate 102 is different from the substrate 2 of FIG. 1 in that a power control line is connected in such a manner that a power control signal therein input from the substrate 101 via the connector 121 is output to the PSU 103 via the connector 123. The PSU 103 is different from the PSU 3 of FIG. 1 in that the power control signal output from the semiconductor circuit 13 on the substrate 101 is input via the substrate 102.

That is, in this embodiment, the power control line from the semiconductor circuit 13 is mixed with the V3 power supply harness 117 (FIG. 3) including the power line for supplying the V3 power. The power control signal transmitted to the power control line is sent to the harness that connects the substrate 102 to the PSU 103 via the connector 123 of the substrate 102. The power control signal is input to the DC/DC converter 7 that is mounted on a direct current power circuit 6 to generate the V1 power.

When the V3 power supply harness 117 transferring the V3 power therein is disconnected in the above configuration, the power control line is also disconnected. When the power control line is disconnected, the power control signal output from the semiconductor circuit 13 cannot be input to the DC/DC converter 7 of the PSU 103, so that the DC/DC converter 7 is not turned on, and hence, the V1 power is not output from the DC/DC converter 7. Accordingly, the V3 power to be applied to the semiconductor circuit 12 is turned off, and thus the V1 power is turned off. That is, when the V3 power supply harness 117 is disconnected, the supply of the V1 power is interrupted to prevent the semiconductor circuit from breaking down.

When the power supply harness 18 that supplies the power from the PSU 103 to the substrate 102 is disconnected, the V1 power is not supplied. That is, the V1 power is not supplied to the semiconductor circuit 12 but the V3 power is supplied. However, in this case, since the power supply condition of the semiconductor circuit 12 is satisfied, the semiconductor circuit 12 does not break down.

When the power supply harness 19 that supplies the power from the PSU 103 to the substrate 101 is disconnected, the V1 power is not supplied to the substrate 101 that generates the V3 power. However, when the power supply harness 19 is disconnected, the V2 power used in the semiconductor circuit 13 is not supplied, either. In this case, since the power control signal is not output from the semiconductor circuit 13, the V1 power is not output, either. Accordingly, none of the V1 power, the V3 power, or the V2 power is output and the power supply condition of the semiconductor circuit 12 is satisfied.

The electronic equipment 100 shown in FIG. 2 may be realized by an image forming apparatus such as a copying machine, a printer, a scanner, a facsimile, or a multi-function peripheral having at least two of a copying function, a printer function, a scanner function, and a facsimile function.

Figure 4:
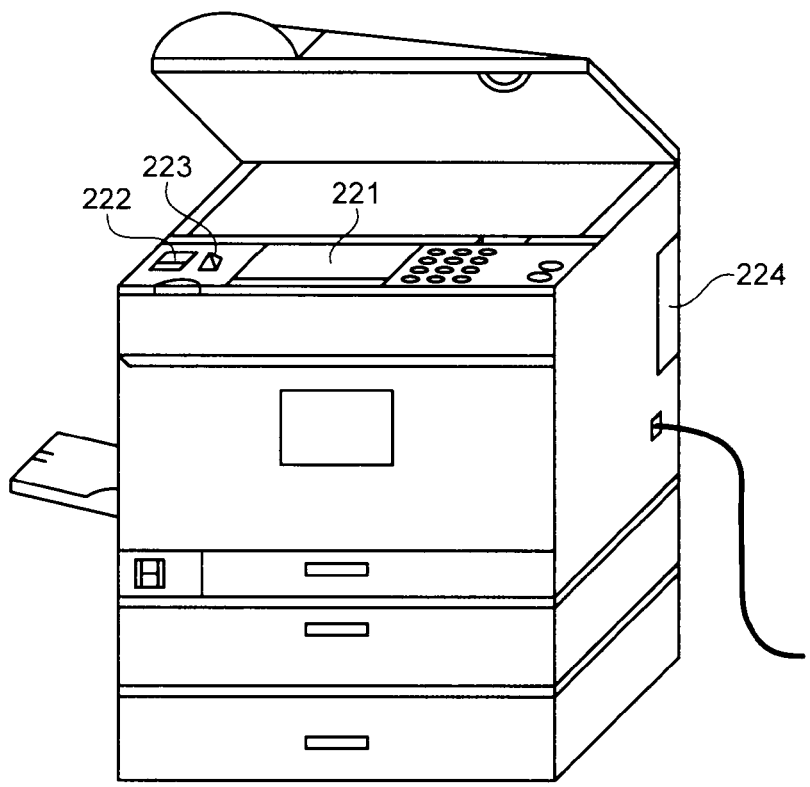
FIG. 4 is a diagram illustrating an external appearance of an image forming apparatus applicable to an electronic device.

FIG. 4 is a diagram illustrating the external appearance of an image forming apparatus applicable to the electronic equipment 100. As shown in FIG. 4, the image forming apparatus includes an operation display unit 221 such as a liquid crystal display, a speaker 222 outputting a buzzer sound or the like, an LED 223 serving as a light-emitting unit that emits light, and a communication unit 224 transmitting and receiving data to and from a network.

The electronic equipment 100 (the image forming apparatus) may be configured to notify an absence of power supply when power is not supplied to the semiconductor 12. For example, the semiconductor circuit 13 that is mounted on the substrate 101 may have a function of a notification unit which detects that power supply to the semiconductor circuit 12 is cut off with reference to information from the signal control harness 20 and notifies that the power supply to the semiconductor circuit 12 is cut off.

For example, when the V3 power supply harness 17 is disconnected, the semiconductor circuit 12 is in an off state. The semiconductor circuit 13 detects that the semiconductor circuit 12 is in the off state via the signal control harness 20. The semiconductor circuit 13 detects that the V3 power supply harness 17 is disconnected and turns on the LED 223. The notification method is not limited to turn on the LED 223, and all conventional methods may be applied. For example, there may be applied a method of making a buzzer sound from the speaker 222, a method of displaying a warning message on the operation display unit 221, a method of transmitting a predetermined error notification message via the communication unit 224 and the network.

In the electronic equipment 100 according to this embodiment, as described above, it is configured in such a manner that the power control line output from the semiconductor circuit 13 and the power line supplying the V3 power are assembled in a same harness, which is the V3 power supply harness 117, so that the power supply condition can be maintained when the harness is disconnected. Accordingly, it is possible to prevent the semiconductor circuit from breaking down with the simple configuration without using a switch that controls input power. Moreover, since a switch is not needed, the substrate can be miniaturized.

Figure 5:
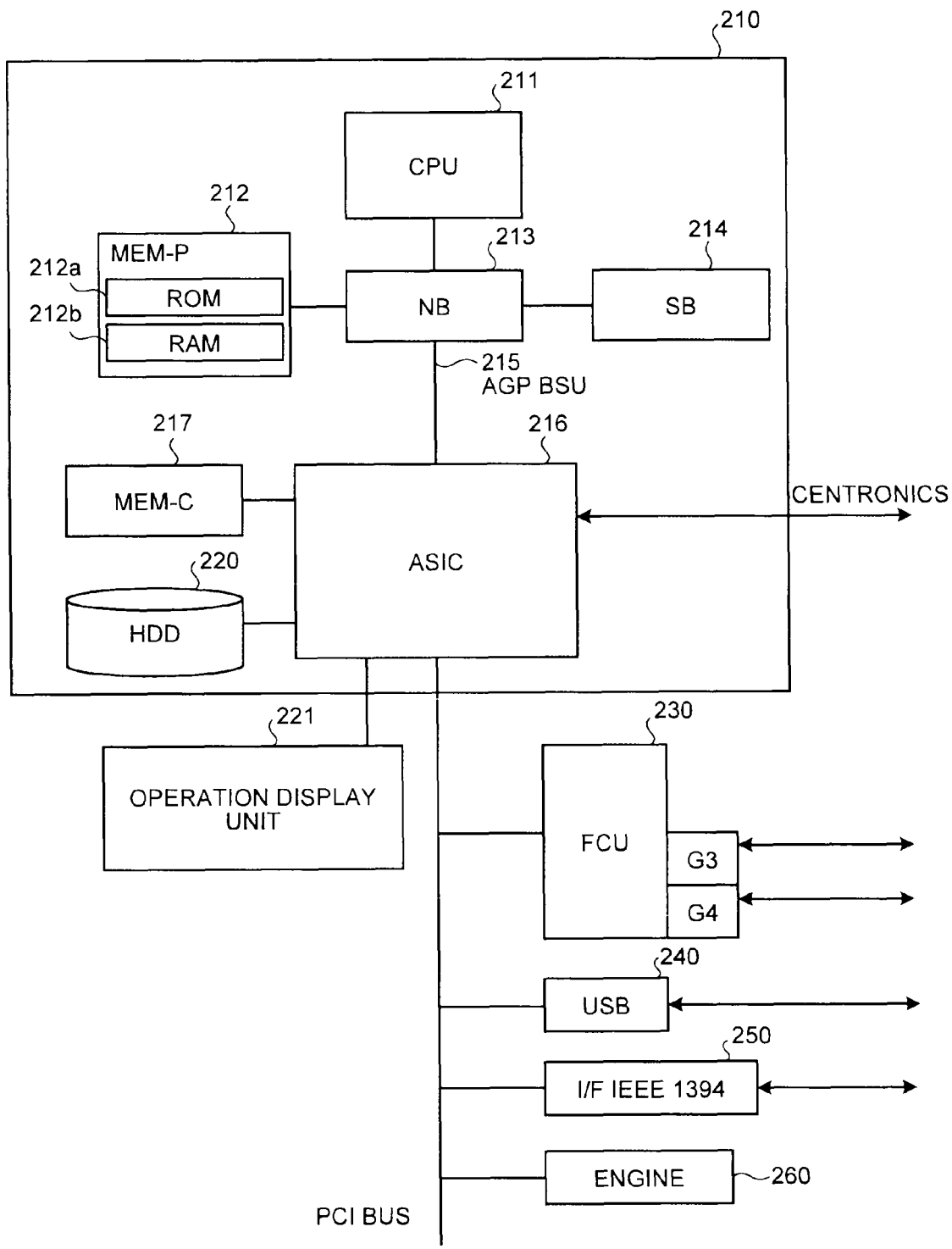
FIG. 5 is a block diagram illustrating an example of the hardware configuration of the image forming apparatus according to the embodiment.

FIG. 5 is a block diagram illustrating an example of the hardware configuration of an image forming apparatus according to this embodiment. As shown in FIG. 5, the image forming apparatus includes a controller 210 and an engine unit 260 connected to each other via a peripheral component interface (PCI) bus. The controller 210 is a controller that controls the entire image forming apparatus, and also controls drawing, communication, and input from an operation unit (not shown). The engine unit 260 is a printer engine which is connectable to the PCI bus, such as a black-and-white plotter, a single-drum color plotter, or a four-drum color plotter, a scanner, or a facsimile unit. The engine unit 260 includes, in addition to an engine portion such as a plotter, an image processing portion performing error diffusion or gamma conversion.

The controller 210 includes a CPU 211, a north bridge (NB) 213, a system memory (MEM-P) 212, a south bridge (SB) 214, a local memory (MEM-C) 217, an application specific integrated circuit (ASIC) 216, and a hard disk drive (HDD) 220. The NB 213 and the ASIC 216 are connected to each other via an accelerated graphics port (AGP) bus 215. The MEM-P 212 includes a read-only memory (ROM) 212a and a random access memory (RAM) 212b.

The CPU 211 controls the entire image forming apparatus and includes a chip set including the NB 213, the MEM-P 212, and the SB 214. The CPU 211 is connected to other equipments via the chip set.

The NB 213 is a bridge connecting the CPU 211 with the MEM-P 212, the SB 214, and the AGP bus 215 and includes a memory controller controlling reading and writing of data from or into the MEM-P 212, and an AGP target.

The MEM-P 212 is a system memory used as a memory storing a program or data, a memory developing a program or data, or a drawing memory for printing. The MEM-P 212 includes the ROM 212a and the RAM 212b. The ROM 212a is a reading-only memory used as a memory storing a program or data. The RAM 212b is a memory which is capable of writing and reading data and is used as a memory developing a program or data or a drawing memory for printing.

The SB 214 is a bridge connecting the NB 213 with the PCI device and peripheral devices. The SB 214 is connected to the NB 213 via a PCI bus. A network interface (I/F) unit or the like is connected to the PCI bus.

The ASIC 216 is an image processing integrated circuit (IC) including an image processing hardware component and has a function of a bridge connecting the AGP bus 215, the PCI bus, the HDD 220, and the MEM-C 217. The ASIC 216 includes a PCI target, an AGP master, an arbiter (ARB) which is a core of the ASIC 216, a memory controller controlling the MEM-C 217, a plurality of direct memory access controllers (DMAC) performing rotation or the like of image data by a hardware logic, and a PCI unit transmitting data via a PCI bus between the PCI unit and the engine unit 260. The ASIC 216 is connected to a facsimile control unit (FCU) 230, a universal serial bus (USB) 240, and an interface 250 of the institute of electrical and electronics engineers 1394 (IEEE 1394) via the PCI bus. The operation display unit 221 is directly connected to the ASIC 216.

The MEM-C 217 is a local memory used as an image buffer for copying or a code buffer. The HDD 220 is a storage which stores image data, programs, font data, and forms.

The AGP bus 215 is a bus interface for a graphic accelerator card proposed for accelerating graphical processing and gains a direct access to the MEM-P 212 with high throughput to operate the graphic accelerator card at a high speed.

According to the invention, it is possible to obtain the advantage that the semiconductor circuit is prevented from broking down with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic equipment comprising:
   a first substrate;
   a second substrate;
   a harness that connects the first and second substrates to each other; and
   a power supply unit that supplies a first power to the first substrate and the second substrate,
   wherein the first substrate includes:
      a conversion unit that converts the first power supplied from the power supply unit into a second power, and outputs the second power to the second substrate, and
      a control unit that outputs a control signal to the power supply unit through the second substrate, the control signal being used to control output of the first power supplied from the power supply unit to the first substrate,
   wherein the second substrate includes:
      a semiconductor circuit operated by the first power supplied from the power supply unit and the second power supplied from the first substrate, and
      a connector that outputs the control signal to the power supply unit, and
   wherein the harness includes a signal line of the control signal and a power line through which the second power is supplied from the first substrate to the second substrate.

2. The electronic equipment according to claim 1,
   wherein the first substrate further includes a notification unit notifying the fact that the second power is not supplied to the semiconductor circuit when detecting that the second power is not supplied to the semiconductor circuit.

3. The electronic equipment according to claim 2,
   wherein the notification unit notifies the semiconductor circuit of the fact that the second power is not supplied to the semiconductor circuit by turning on a light source, when detecting that the second power is not supplied to the semiconductor circuit.

4. The electronic equipment according to claim 2,
   wherein the notification unit notifies the semiconductor circuit of the fact that the second power is not supplied to the semiconductor circuit by ringing an alarm when detecting that the second power is not supplied to the semiconductor circuit.

5. The electronic equipment according to claim 2,
   wherein the notification unit displays a message indicating that the second power is not supplied to the semiconductor circuit on a display unit, when detecting that the second power is not supplied to the semiconductor circuit.

6. The electronic equipment according to claim 2,
wherein the notification unit transmits a message, which indicates that the second power is not supplied to the semiconductor circuit, to a network, when detecting that no power is supplied to the semiconductor circuit.

7. An image forming apparatus comprising:
a first substrate;
a second substrate;
a harness connecting the first substrate and the second substrate with each other, and
wherein the first substrate includes:
  a conversion unit that converts the first power supplied from the power supply unit into a second power, and outputs the second power to the second substrate, and
  a control unit that outputs a control signal to the power supply unit through the second substrate, the control signal being used to control output of the first power supplied from the power supply unit to the first substrate,
wherein the second substrate includes
  a semiconductor circuit operated by the first power supplied from the power supply unit and the second power supplied from the first substrate, and
  a connector that outputs the control signal to the power supply unit, and
wherein the harness includes a signal line of the control signal and a power line through which the second power is supplied from the first substrate to the second substrate.

\* \* \* \* \*